United States Patent Office 2,848,432
Patented Aug. 19, 1958

2,848,432

STABILIZATION OF LINEAR POLYESTER RESINS AGAINST DEGRADATION BY HYDROLYSIS BY THE ADDITION OF AN ACRYLAMIDE POLYMER

Roger M. Schulken, Jr., and John W. Tamblyn, Kingsport, Tenn., assignors to Eastman Kodak Company, Rochester, N. Y., a corporation of New Jersey No Drawing. Application February 13, 1956
Serial No. 564,889

8 Claims. (Cl. 260—45.4)

The present invention relates to the stabilization of linear polyester resins. It is concerned with novel thermoplastic resinous compositions comprising linear polyesters and additives which serve to inhibit degradation of the polyesters presumably caused by hydrolysis.

Linear polyester resins are thermoplastic and are moldable by extrusion, melt spinning, or the like. Many such resins are known and a number of these are in current commercial use for a variety of purposes. The useful polyesters include those formed by polyesterification of hydroxy acids and those formed from polyesterification of glycols with dibasic acids. Examples of known linear polyesters and various methods for preparing them are found, for instance, in Wagner U. S. Patent 2,035,578, issued March 31, 1936, Carothers U. S. Patents 2,071,250 and 2,071,251, issued February 16, 1937, Fuller U. S. Patent 2,249,950, issued July 22, 1941, Dickson U. S. Patent 2,465,150, issued March 22, 1949, Whinfield et al. U. S. Patent 2,465,319, issued March 22, 1949, Caldwell U. S. Patent 2,593,411, issued April 22, 1952, Higgins U. S. Patent 2,676,945, issued April 27, 1954, and in the published abstract of Flory U. S. patent application Ser. No. 738,221, filed March 29, 1947, published March 24, 1953.

As is commonly recognized, linear polyesters generally are susceptible to hydrolysis under certain conditions. Hydrolysis results in cleavage of the molecular chains and consequent loss of strength and other desirable properties characteristic of the polymeric state. Conditions favoring hydrolysis, such as elevated temperatures in the presence of moisture, are always encountered to greater or less degree in the processes of preparation, fabrication, and subsequent use. Hydrolysis is greatly aggravated if the resin system departs slightly from neutrality, either in the acidic or alkaline direction. For example, the addition of either sulfur dioxide or ammonia to these systems markedly accelerates hydrolytic breakdown. Hydrolysis may also occur during exposure to sunlight in the presence of water, as in the normal weathering process.

It is an object of the present invention to provide efficient hydrolysis-inhibiting stabilizers which are compatible and effective with linear polyester resins. It is another object to provide stabilization of linear polyester resins against degradation which oridinarily results when these resins are heated in the manufacture, processing or use thereof. A still further object is to improve stabilization of thermoplastic polyester resin compositions against degradation from ultraviolet radiation and weathering by furnishing assistants for the normal ultraviolet stabilizers. An additional object is to provide stable compositions of thermoplastic linear polyester resins. A further object is to provide a method of stabilizing thermoplastic polyesters for use in extrusion molding and melt spinning. A still further object is to provide specifically for the stabilization against hydrolysis of sulfone polyester resins of linear structure. Still another object is to produce thermoplastic linear polyester compositions which will not undergo hydrolysis or degradation when subjected to extrusion molding or to melt spinning or to ultraviolet radiation and heat, that is, to stabilize these linear polyesters against hydrolytic breakdown under conditions of processing or use where such breakdown is normally met. Another object is to fabricate articles of polyesters such as films, fibers, extruded and molded shapes and the like which will be resistant to hydrolytic breakdown.

We have discovered that if polymeric buffering agents, particularly certain polymers having acid- and base-accepting groups, are added in small amounts to linear polyesters, the latter are thereby rendered much more stable and less subject to hydrolytic action when heated to elevated temperatures. We have also found that the polymeric buffering agents of this invention, while ordinarily not significantly effective in stabilization of thermoplastic linear polyester resins against ultraviolet radiation and weathering, provide significantly increased ultraviolet and weathering stabilization for these polyester resins when used as assistants with known polyester ultraviolet and weathering stabilizers.

In accordance with our invention, good heat stabilization can be provided for a thermoplastic linear polyester resin by incorporating in the resin a small amount, e. g. about 0.1–3%, by weight of a polymeric buffering agent which preferably is selected from the group consisting of sodium acrylate polymer, homopolymers of N-methyl methacrylamide and N-isopropyl acrylamide and copolymers containing at least 50% by weight of these N-substituted amides with monomers selected from the group consisting of acrylonitrile, acrylic acid, maleic anhydride and 2-methyl-5-vinylpyridine.

The invention is carried out by addition of powdered polymeric buffer to the polyester after the latter has been prepared. The method of mixing is not critical and may be accomplished in any way known to the art which will give a homogeneous mixture. For instance, the polymer and additive, with both in powdered form, may be mixed together in a tumbling machine and immediately thereafter or at any later time subjected to the fabricating operation such as rolling, extruding or molding. A more intimate degree of mixing may be obtained in cases where no unfavorable reaction may occur by incorporating the powdered additive in the monomeric material before preparation of the polyester by polyesterification.

The polymeric buffering agents which are used as stabilizers in accordance with this invention are per se known in the art, as are various methods for their preparation. For example, homopolymers and copolymers of N-methylacrylamide and of N-isopropylacrylamide are described, together with methods for their preparation, in "Vinyl and Related Polymers," Schildknecht, p. 317 (1952). Copolymers of N-isopropylacrylamide and 2-methyl-5-vinylpyridine could be made by the same methods; see also p. 160 of the above Schildknecht reference.

The invention is illustrated in the following examples.

EXAMPLE 1

The stabilization against breakdown by heat which these materials impart to linear polyester was determined by measuring the viscosity breakdown occurring when a molten polyester was extruded as film both with and without additive. Resistance to weathering was obtained both outdoors and in a Twin-Arc Atlas Weather-Ometer modified by the addition of eight Westinghouse fluorescent sun lamps and operated at a black panel temperature of 150° F. Evaluation of resistance to weathering breakdown was made by measurement of flexural strength decay and brittleness development in extruded films. It was found that the polymeric buffering agents themselves gave little protection against weathering breakdown but that they markedly increased the protective action of the usual ultraviolet stabilizers, such as the derivatives of 2-hydroxybenzophenone and thiazolidones such as 3-anisyl-2 - anisylimino - 5 - anisylidene - 4 - thiazolidone, and 3 - anisyl - 2 - anisylimino - 5 - benzylidene - 4 - thiazolidone.

EXAMPLE 2

A sample of polyester made from 1,5-pentanediol and p,p'-dicarboxy diphenyl sulfone, in powdered form, was mixed with 1% of its weight of a copolymer containing 90% N-isopropyl acrylamide and 10% acrylic acid. This mixture was then extruded in the form of a 30-mil thick film through a single screw extruder with a die temperature of 550° F. The average length of time during which the polymer was exposed to such temperature was about 1½ minutes. A sample of the untreated polyester was also extruded in the same way. Inherent viscosities were determined before and after extrusion as measures of the breakdown caused by such mechanical and heat treatment. The inherent viscosity, defined as $$\frac{ln\eta_r}{0.25}$$

where $\eta_r$ is the ratio of the viscosity of a solution containing 0.25 g. polyester in 100 cc. solvent to the viscosity of the pure solvent, was measured in 60:40 (by weight) phenol:tetrachloroethane as solvent at 25° C. Table 1 compares the beneficial heat-stabilizing effect of the polymeric buffering agent with that of other acidic or basic additives. The polyester used for these experiments had an inherent viscosity of 0.77 before extrusion. None of the small-molecule additives contributed any stabilization. In fact, the majority of them increased the amount of extrusion breakdown over that observed in the untreated polyester.

*Table I*

| Run No. | Additive | Percent Additive | Inherent Viscosity After Extrusion | Percent Loss in Inherent Viscosity During Extrusion |
|---|---|---|---|---|
| 1 | none | | 0.69 | 10.4 |
| 2 | copolymer of 9:1 N-isopropyl acrylamide: acrylic acid. | 1 | 0.75 | 2.6 |
| 3 | stearic acid | 1 | 0.69 | 10.4 |
| 4 | p,p'-dicarboxy diphenyl sulfone | 1 | 0.69 | 10.4 |
| 5 | bicyclo-(2.2.1)-5-heptene-2,3-dicarboxylic acid. | 5 | 0.69 | 10.4 |
| 6 | 1,2,3,4-tetracarboxy butane | 3 | 0.67 | 13.0 |
| 7 | 1,3-diphenyl guanidine | 1 | 0.53 | 31.2 |
| 8 | melamine | 1 | 0.62 | 19.5 |
| 9 | sodium borate | 1 | 0.53 | 31.2 |
| 10 | sodium stearate | 1 | 0.48 | 37.7 |
| 11 | calcium stearate | 1 | 0.65 | 15.6 |
| 12 | boric oxide | 2 | 0.63 | 18.2 |
| 13 | copolymer of 9:1 N-isopropyl acrylamide: maleic anhydride. | 1 | 0.71 | 7.8 |
| 14 | poly N-methyl methacrylamide | 1 | 0.74 | 3.9 |
| 15 | copolymer of 9:1 N-isopropyl acrylamide: 2-methyl-5-vinylpyridine. | 1 | 0.75 | 2.6 |
| 16 | 50-50 mixture by weight of the additives of runs 13 and 15. | 1 | 0.78 | none |

EXAMPLE 3

A sample of linear polyester made from 1,5-pentanediol, succinic acid, and p,p' - dicarboxydiphenyl sulfone, in the molecular proportions 6:1:5, was extruded as in Example 2. The inherent viscosity of this polymer was 0.76 before extrusion. Samples of the linear polyester without stabilizer and with various additives were extruded and inherent viscosities of the samples determined before and after extrusion as in Example 2. Results are recorded in the following table.

*Table II*

| Run No. | Additive | Percent Additive | Inherent Viscosity After Extrusion | Percent Loss in Inherent Viscosity During Extrusion |
|---|---|---|---|---|
| 1 | None | | 0.70 | 7.9 |
| 2 | sodium poly-acrylate | 1 | 0.74 | 2.6 |

EXAMPLE 4

Samples of the linear polyester of Example 2, in extruded film form 30-mil thick, were exposed in the modified Weather-Ometer described above. The progress of deterioration in physical properties was followed by measurements of flexural strength and brittleness. For this purpose the Tour-Marshall test for stiffness in flexure was used (A. S. T. M. D747–43T). Brittleness was defined to have developed when the test sample broke at a bend angle of less than 90°. Similar films were made containing ultraviolet stabilizers, both with and without additional polymeric buffering agent. These films were also exposed to the artificial weathering conditions. The results shown in Table III illustrate how well the polymeric buffers fortified the ultraviolet stabilizers.

Table III

| Ultraviolet Stabilizer | Percent Ultraviolet Stabilizer | Polymeric Buffer | Percent Polymeric Buffer | Properties After 400 Hours' Exposure to Artificial Weathering | | Properties After 1,000 Hours' Exposure to Artificial Weathering | |
|---|---|---|---|---|---|---|---|
| | | | | Percent Initial Flexural Strength Retained | Toughness | Percent Initial Flexural Strength Retained | Toughness |
| None | | None | | 76 | Brittle | | |
| Do | | 9:1 N-isopropyl acrylamide: maleic anhydride copolymer | 1 | 80 | ---do--- | | |
| Do | | Amberlite IRC-50 | 1 | 70 | ---do--- | | |
| Do | | poly N-isopropyl acrylamide | 1 | 68 | ---do--- | | |
| Do | | poly N-methyl methacrylamide | 1 | 75 | ---do--- | | |
| 2,4-dihydroxy benzophenone | 1 | None | | 93 | Tough | 70 | Brittle. |
| Do | 1 | 9:1 N-isopropyl acrylamide acrylic acid: copolymer | 1 | 92 | ---do--- | 84 | Tough. |
| Do | 3 | None | | 106 | ---do--- | 72 | Brittle. |
| Do | 3 | poly N-methyl methacrylamide | 1 | 92 | ---do--- | 92 | Tough. |
| 2,2'-dihydroxy-4,4-dimethoxy benzophenone | 3 | None | | 103 | ---do--- | 84 | Do. |
| Do | 3 | 9:1 N-isopropyl acrylamide: maleic anhydride copolymer | 1 | 120 | ---do--- | 120 | Do. |

EXAMPLE 5

The linear polyester of Example 2 was compounded with 5% zinc oxide, extruded as 30-mil thick film, and exposed outdoors at Kingsport, Tennessee, for 1 year. Similar films containing in one case no pigment and in the other case pigment along with polymeric buffer were also exposed. Table IV, giving the results, shows how the addition of the polymeric buffer increased the ultraviolet stabilizing action of the zinc oxide pigment.

Table IV

| Ultraviolet Stabilizer | Percent Ultraviolet Stabilizer | Polymeric Buffer | Percent Polymeric Buffer | Properties After 1 Year's Exposure Outdoors | | |
|---|---|---|---|---|---|---|
| | | | | Percent Initial Flexural Strength Retained | Toughness | Percent Initial Inherent Viscosity Retained |
| None | | None | | 20 | Brittle | 64 |
| Zinc oxide | 5 | ---do--- | | 41 | Tough | 80 |
| Do | 5 | 9:1 N-isopropyl acrylamide: maleic anhydride copolymer | 1 | 82 | ---do--- | 92 |

In the foregoing we have described the invention and methods of making and using the same as well as the best mode contemplated by us for the carrying out of the invention. However, we do not intend to limit the scope of the invention to the species herein disclosed as it will be immediately obvious to those skilled in the art that there are a number of equivalent species with respect to which the invention will be of operative and equal value.

The term "N-alkyl acrylamides" as used in the claims is intended to define the genus comprising N-alkyl acrylic acid amides and N-alkyl methacrylic acid amides.

We claim:

1. A thermoplastic composition substantially composed of a linear polyester derived from the condensation of an aromatic nuclearly substituted dicarboxy compound and a glycol containing from about 0.1 to about 3% by weight of said linear polyester of a polymeric buffering agent selected from the group consisting of sodium acrylate polymers, homopolymers of N-lower alkyl acrylamides, and copolymers containing at least 50% by weight of N-lower-alkyl acrylamides with monomers selected from the group consisting of acrylonitrile, acrylic acid, maleic anhydride and 2-methyl-5-vinylpyridine, which polymeric buffering agent is present in sufficient amount to substantially reduce loss in inherent viscosity of the composition resulting from exposure to heat.

2. An improved thermoplastic composition as defined in claim 1 wherein the polymeric buffering agent is a polymer derived from N-isopropyl acrylamide and 2-methyl-5-vinylpyridine.

3. An improved thermoplastic composition as defined in claim 1 wherein the polymeric buffering agent is a polymer derived from N-isopropyl acrylamide and acrylic acid.

4. An improved thermoplastic composition as defined in claim 1 wherein the polymeric buffering agent is a polymer derived from N-methyl methacrylamide.

5. An improved thermoplastic composition as defined in claim 1 wherein the polymeric buffering agent is a polymer derived from N-isopropyl acrylamide.

6. An improved thermoplastic composition as defined in claim 1 wherein the polymeric buffering agent is a polymer derived by admixing equal proportions by weight of a copolymer of N-isopropylacrylamide and maleic anhydride and a copolymer of N-isopropyl acrylamide and 2-methyl-5-vinylpyridine.

7. An improved thermoplastic composition as defined in claim 1 which is further stabilized against loss in inherent viscosity due to weathering by means of the presence of a stabilizing amount of a light stabilizing agent capable of reducing deterioration caused by exposure to ultraviolet light, the amount of light stabilizing agent being from about 1% to about 5% by weight of said linear polyester.

8. An improved thermoplastic composition as defined in claim 7 wherein the light stabilizer is selected from the group consisting of 2,4-dihydroxybenzophenone and 2,2-dihydroxy-4,4'-dimethoxybenzophenone.

References Cited in the file of this patent

UNITED STATES PATENTS 2,598,663    Kropa            June 3, 1952